United States Patent Office 3,433,919
Patented Mar. 18, 1969

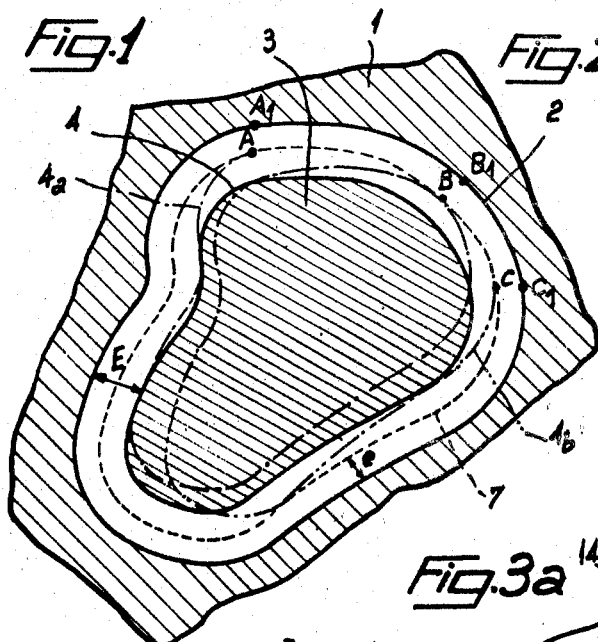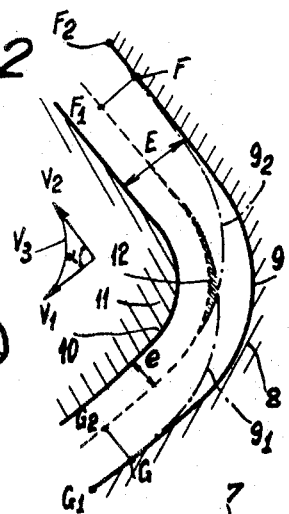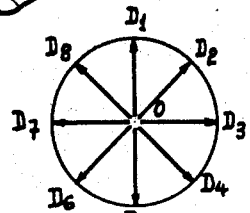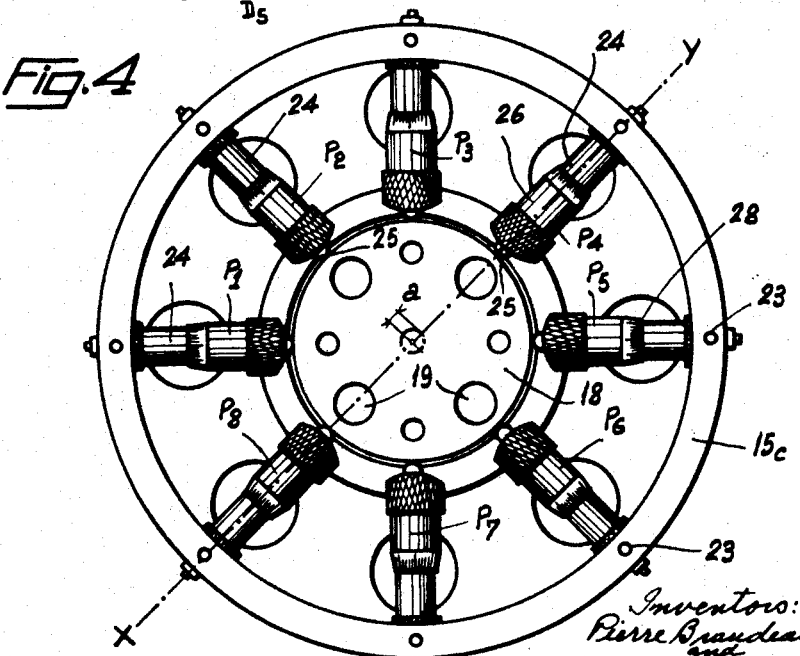

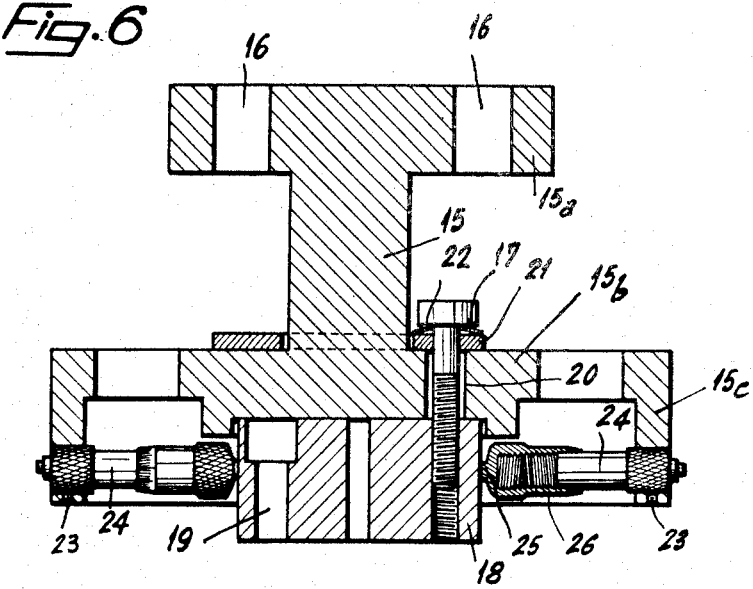
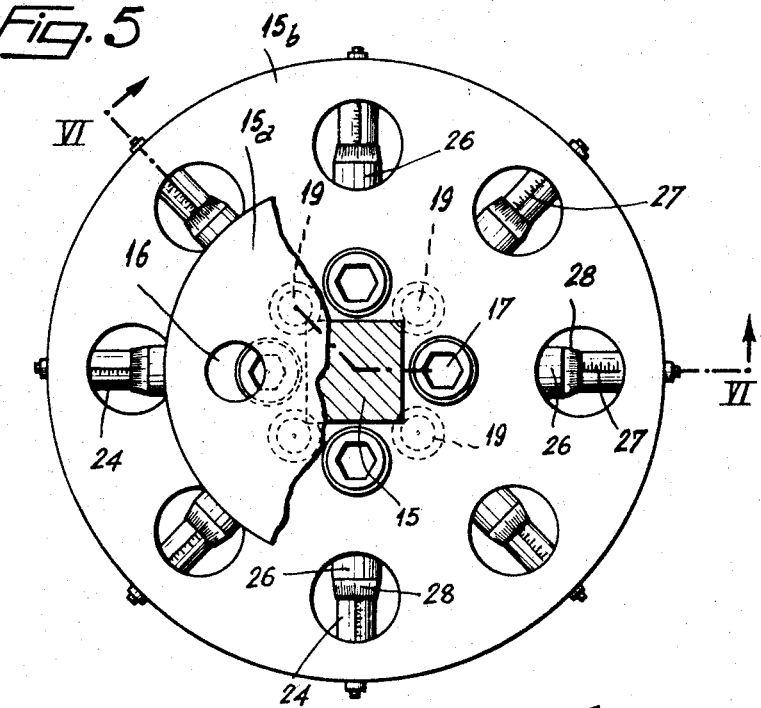

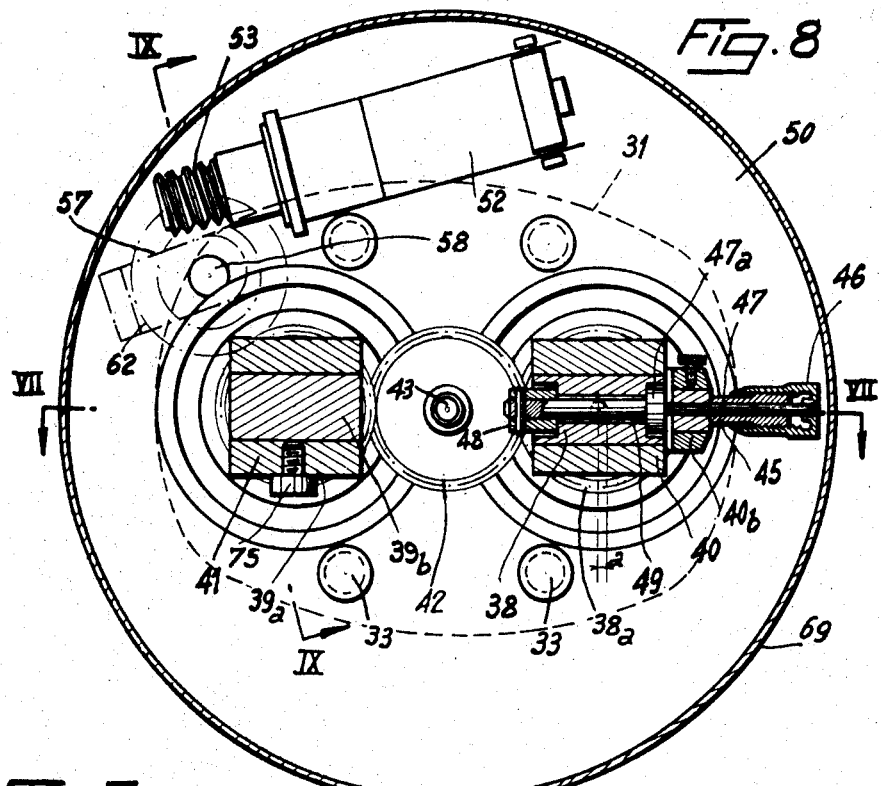
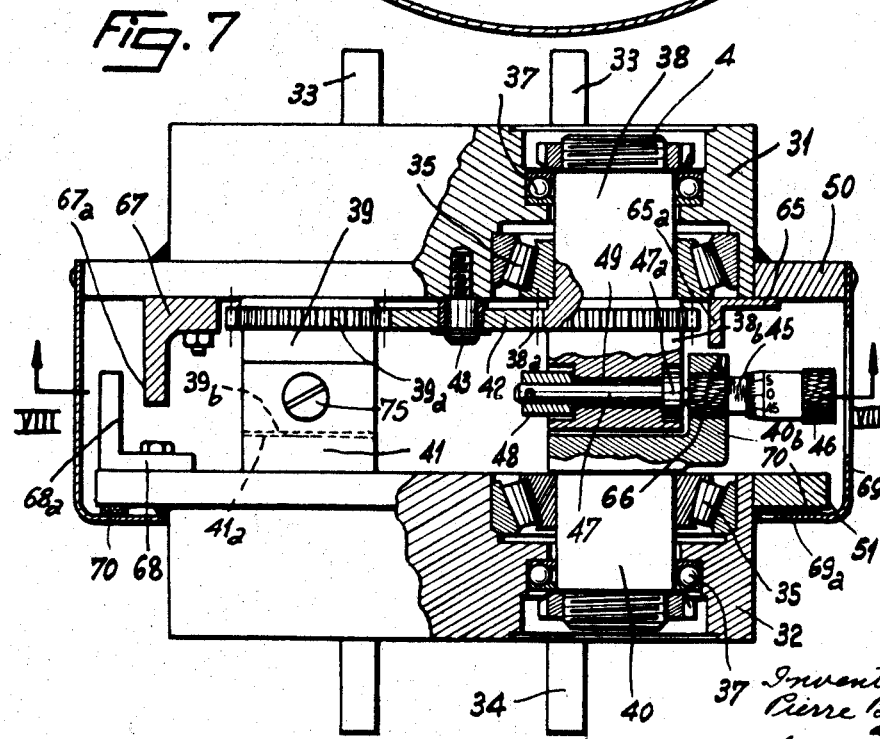

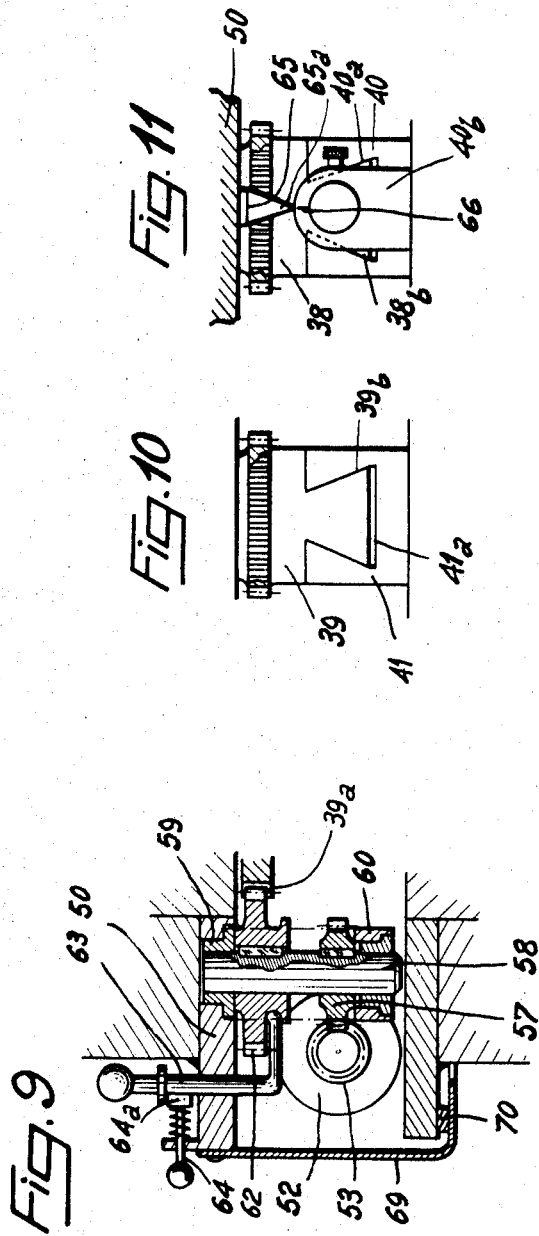

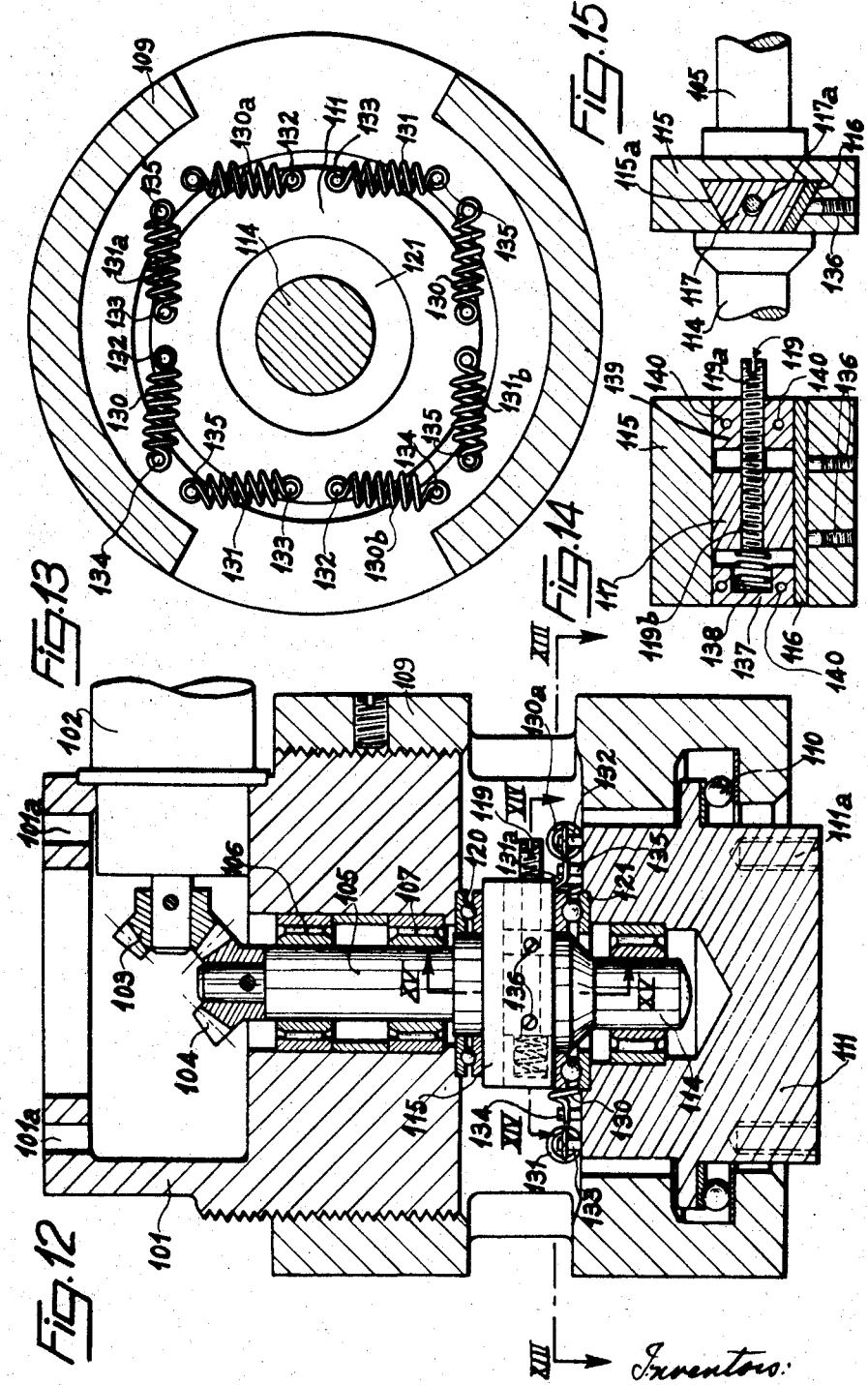

3,433,919
APPARATUS FOR ELECTRICALLY TREATING
WORKPIECES WITH ELECTRODES
Pierre Braudeau, Paris, and Alfred M. A. Maillet,
Versailles, Yvelines, France, assignors to La
Soudure Electrique Languepin, Paris, France, a
company of France
Filed Aug. 24, 1961, Ser. No. 133,667
Claims priority, application France, Aug. 26, 1960,
836,908; Apr. 4, 1961, 857,687; June 16, 1961,
865,223; July 17, 1961, 868,124
U.S. Cl. 219—69    7 Claims
Int. Cl. B23k 11/22, 11/30, 9/16

This invention relates to apparatus for electrically treating workpieces by means of an electrode.

It is known that it is possible to treat or work an electrically-conducting workpiece by electrical means, for example by means of an electrode held in close proximity to the workpiece.

In particular, it is possible to shape such a workpiece, i.e. to remove material from it, by electrical erosion, utilising either a series of separate sparks or electric arcs, interrupted at regular intervals, or by an electrolytic action, or by a combination of these two methods.

It is also possible, by reversing the procedures, to deposit metal on a workpiece by electrolytic means or by an arc discharge.

Generally speaking, the electrical treatment has a particular effect at the location where the gap between the electrode used for the treatment and the workpiece is smallest, i.e. where the electrical field is most intense. Particularly in electric erosion techniques, using arc and spark discharges, the treatment is restricted exclusively to the regions where the smallest gaps between the electrode and the workpiece exist, while the effectiveness of the treatment diminishes very considerably in electrolytic methods in regions remote from these smallest gaps.

One of the most interesting prospects offered by shaping by means of an electric erosion process, and particularly shaping by spark discharges, is that it makes it possible, by approaching an electrode of any suitable shape towards a workpiece, the actual cutting of the workpiece to the shape of the electrode.

However, the shaping thus obtained, through precisely following the shape of the electrode, has not its exact dimensions. The dimensions of the shaping or cut are increased with reference to the electrode (where an internal outline is involved) by the length of path of the sparks at the rate of shaping, i.e. by the energy developed by each of these sparks at the different working speeds.

In order to use to best advantage shaping machines operating by spark discharges, however, the rate of erosion should not be constant during the making of a component.

Initially, to rough out the blank, i.e. to obtain a first, coarse shaping, in principle, the highest working speed is used, i.e. sparks of maximum intensity which remove large amounts of metal in a relatively short time.

In this case, the length of path covered by the spark is long, which favours moreover the need to remove, by means of a dielectric fluid, large amounts of material eroded from the component, but, on the other hand, the state of the shaped surface is very rough, since each of the powerful sparks leaves a large pit or hole in the surface being shaped.

To improve this surface condition, sparks of progressively diminishing energy are used, the path covered by the sparks being far shorter, and these sparks make progressively smaller pittings thus providing a progressively more satisfactory surface finish.

To allow for the variation in the length of path of the sparks, depending on their energy, it has been necessary up to the present, when shaping a workpiece to accurate dimensions, to use a series of electrodes, all similar save for the dimensions which are adapted to the particular speed at which each of them is used.

When the electrodes have a simple shape and can be produced by standard machine tools (lathe, miller), it is relatively easy, although tedious and time-consuming, to obtain a series of electrodes of the same shape but of increasing dimensions.

However, when the electrode has a complex shape which is obtained by "thickening" in variable degrees a series of identical electrodes of small dimensions or by "reducing the thickness" in variable degrees of a series of identical electrodes of large dimensions, one of these electrodes remaining unchanged and representing respectively the first or the last of the series, it is a very difficult, very time-consuming and very tedious process to obtain electrodes all of which are similar in shape and the dimensions of which are graduated in the desired manner.

The object of the present invention is to provide apparatus for electrically treating a workpiece by a single electrode which can be adapted to all the conditions of treatment of the workpiece.

The apparatus according to the present invention is applicable irrespective of the kind of electrical treatment applied, i.e. whether the current in passing removes or deposits metal on the workpiece.

The present invention resides in apparatus for electrically treating a workpiece by means of an electrode, the surface of which corresponds to the surface of the workpiece to be treated, so that the workpiece and electrode correspond or match one with the other with a gap therebetween, the apparatus being such that, during the series of shaping operations, the workpiece and the electrode move relative to each other in parallel relationship so that with reference to the workpiece, the electrode overlies or covers a surface parallel to its own surface and separated from the surface of the workpiece to be shaped by a gap smaller than the mean gap between electrode and workpiece.

In particular, in the case where the workpiece is shaped by electric erosion, an electrode of dimensions and shape corresponding to those of the surface to be shaped on the workpiece, during the series of shaping operations at progressively decreasing speed, is preferably translationally moved transversely to the direction of its advance towards the workpiece in such manner that the sections of this electrode through planes perpendicular to this direction of feed remain constantly parallel to themselves and the displaced positions of each of the said sections are enveloped or surrounded by an outline parallel to that of the corresponding cross-section.

During each of these successive shaping operations, the electrode, during the displacements to which it is subjected, is preferably approached towards the surface already shaped during the preceding operation by an amount corresponding to the extent of the said transverse displacement, i.e. it behaves locally as an electrode of greater dimensions.

It will be shown hereinafter that, starting from a central position of the electrode, a limited number of motions, radiating from the centre, and in practice preferably eight, spaced at regular angular intervals is sufficient to ensure that the enveloping surface is almost exactly the parallel surface desired.

Preferably, the relative motion of the electrode and of the workpiece is a circular motion of variable radius around the central position of the electrode.

Thus, the successive outline points of each cross-section come successively in contact with the enveloping surface which, in the case where the electrode has a convex outline, corresponds almost exactly to a surface parallel to that of the electrode.

Compared with the known technique of electrical erosion by spark discharges, which uses electrodes of graduated dimensions, the said electrodes being fixed with reference to the support moving them in the direction of the component, two considerable advantages are further obtained.

It is known, in fact, that in the technique of shaping by electric erosion, although the bulk of the material removed comes from the workpiece, the electrode also is eroded, so that its dimensions decrease. It is thus essential, in the usual method, either to reject the worn electrodes, or to build up their surface, to restore the original dimensions.

On the other hand, the apparatus in accordance with the present invention enables eroded or worn electrodes to be used until they become unusably deformed, and in particular, it permits eroded or worn rough-cutting electrodes to be used by increasing the amplitude of the motion to which they are subjected. It also permits very accurate shaping of a surface to accurately specified dimensions since it is always possible, by controlling the amplitude of the motion or motions to which the electrode is subjected, to obtain, in the form of the enveloping surface of this electrode, during its motions, a fictitious electrode which has precisely the dimensions desired.

In the case of electrolytic erosion, even for the roughing operation, it is advantageous to use an electrode for which the mean gap between the surface to be shaped and the electrode is appreciably greater than the working gap, so that it is necessary to subject the workpiece and the electrode to a relative displacement during the shaping process, in order effectively to localise the location where, at each instant, the electrical field is most powerful so that irregularities in shaping due to scattering in the electrolytic bath of the lines of force of the electrical field are reduced to a minimum.

Finally, whereas in the ordinary methods of electrical treatment of this kind, in which the electrode and the workpiece are fixed, this treatment is effected at each instant at any particular point and distribution of the total effect is statistical, which results in numerous irregularities in the distribution and current consumption, by using the apparatus in accordance with the present invention, the treatment is effected successively at all points in the surface to be treated. Furthermore, it is possible with the present apparatus to ensure that the treatment continues for the same time at each of the points successively treated.

The apparatus, according to the present invention comprises two parts to which the electrode and workpiece are adapted to be attached in parallel relationship, and means for guiding said parts relative to each other and effecting translational displacement of said parts in a plurality of directions contained in the same plane and distributed uniformly in said plane.

Embodiments of the present invention will now be described, by way of example, with reference to the accompanying drawings, in which:

FIG. 1 is a diagrammatic plan view of a workpiece and an electrode for shaping by removal of material from the workpiece;

FIG. 2 is a similar view of an electrode for shaping an external part of a workpiece;

FIGS. 3 and 3a are diagrams showing two possible forms of motion which can be imparted to, or outlines which can be shaped by, the electrode;

FIGS. 4 and 5 are respectively fragmentary views from above and below of an electrode carrier for effecting the diagram in FIG. 3;

FIG. 6 is a section on the line VI—VI of FIG. 5;

FIG. 7 is a longitudinal sectional elevation of an electrode carrier permitting the motion diagrammatically shown in FIG. 3a to be obtained;

Figure 16:
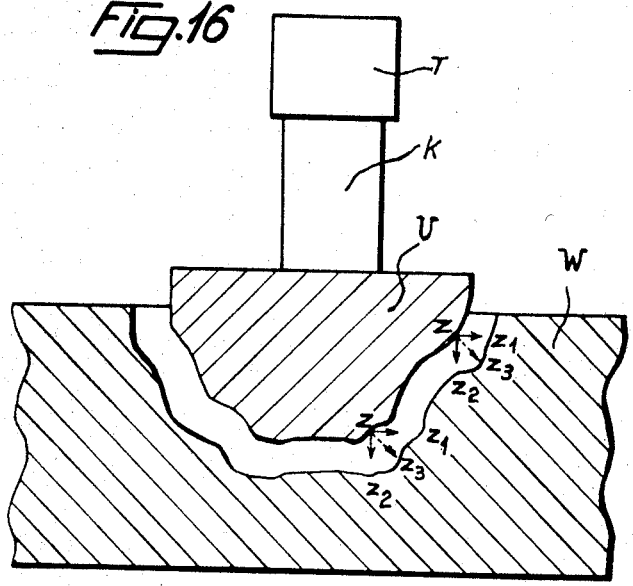
Figure 17:
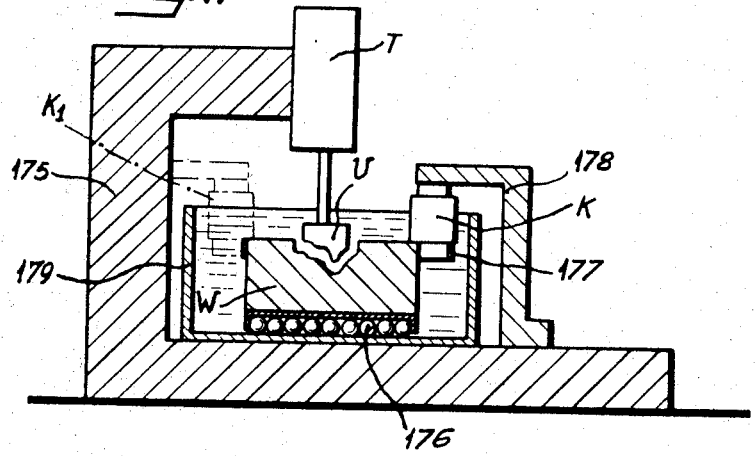

FIG. 8 is a section on the line VIII—VIII of FIG. 7;
FIG. 9 is a section on the line IX—IX of FIG. 8;
FIGS. 10 and 11 are respectively views on the lines X—X and XI—XI of FIG. 7;
FIG. 12 is a sectional elevation of a modified form of the shaping apparatus;
FIGS. 13, 14 and 15 are respectively sections on the lines XIII—XIII, XIV—XIV and XV—XV of FIG. 12.
FIG. 16 is a diagrammatic view showing shaping by electric erosion.
FIG. 17 is a diagrammatic view of another modified apparatus in which the electrode is fixed, while a circular motion is imparted to the frame carrying the workpiece.

By progressively feeding forward an electrode perpendicularly to the plane of FIG. 1, it is possible to shape in the workpiece represented by the hatched surface 1, a depression with the outline 2. This outline may be the generating line of a cylindrical surface, the axes of which are perpendicular to the plane of FIG. 1, which depression passes right through the workpiece to form an opening therein or passes only partially through it on forming a depression in the said workpiece.

The outline 2 can also have the cross-section of a surface developing to form a truncated cone or a cone, which represents a depression or opening made in the workpiece 1.

To produce the outline of the surface 2, an electrode 3 is used having an outline 4 parallel to the desired outline 2.

In the case of shaping by spark discharges, to rough out the surface to give the outline 2, sparks with a very high unit intensity are caused to pass which consequently travel in the dielectric shaping bath through a distance E removing metal from the workpiece.

It is desirable, therefore, during the roughing stage to obtain a surface outline 2 such that the dimensions of the electrode 3, over the whole periphery of the latter, are less than those of the outline 2 by an amount equal to the length of travel E of the sparks at this stage, in other words, the outline 4 is parallel to the outline 2 but displaced inwardly by an amount equal to the distance E.

Having thus roughly obtained the desired outline 2 on the workpiece surface, it is necessary to finish this surface by removing the protuberances left at the roughing stage. For this purpose, it is desirable to work or treat the surface 2 with the electrode at one or more speeds at which the sparks have a far lower intensity.

Let us assume that a single pass at the finishing speed is necessary. The sparks of far lower intensity then spark across the distance $e$ which, for example, is only half the distance E.

To obtain the desired result, it would be desirable, therefore, that the electrode used at this speed should have an outline 7, i.e. should be bounded by an outline parallel to the outlines 2 and 4 but lying midway between them.

Up to the present, a new electrode of outline 7 would in fact be used in practice.

The present invention, however, is based on the following observations:

In view of the fact that, in the case of shaping by spark discharges, the distances E and $e$ are, for practical purposes, very small (for example, of the order of a fraction of a millimeter), if the outline 4 is moved, while maintaining it parallel, until it forms a tangent to the outline 7, for instance, into position 4a, along a large arc of a kind such as the arc AB, the two outlines will practically coincide. If, therefore, the electrode 3 is brought forward in such manner that its outline 4 moves to 4a, the sparks can be produced over the portion of the electrode corresponding to the arc AB and shape the opposite portion $A_1B_1$ of the surface 2.

The electrode can then be translationally moved over any suitable path remaining within the outline 7, preferably while remaining constantly parallel to itself, until the outline 4 reaches the position 4b, which enables the arc $B_1C_1$ following the arc $A_1B_1$ to be shaped according to the arc BC.

A series of such movements of the electrode bringing it at last in the final position, parallel to the starting position, thus makes it possible to shape successively the whole of the surface 2.

In the case shown in FIG. 1, the electrode 3 shapes a contour within the periphery of the workpiece 1. The same observations, however, apply in the case shown in FIG. 2, where the electrode 8 positioned at the inner outline 9 is intended to shape the outer outline 10 of a workpiece 11.

During the roughing stage, the length of path of the spark is indicated, as previously by E, and during the finishing stage, which it is assumed is a single pass, this length is reduced to $e$ (parallel to outline 12).

Let us consider any two points F and G on the outline 9. For the motion represented by the vector $V_1$, the point F is moved to $F_1$ and the point G to $G_1$, the outline 9 taking up the position $9_1$, tangential at $F_1$ to the outline 12. Returning now to the starting position, the outline 9 can be moved by the displacement represented by the vector $V_2$, from position 9 to position $9_2$, F moving to $F_2$ and G to $G_2$, so that the outline 9 is tangential at $G_2$ to the outline 12.

During these two successive operations, the outline 10 could be shaped with low-energy sparks but there would be a risk, however, that the shaping might be a little more defective in the portion of this outline facing the small curvilinear triangle, hatched in the drawing, where, in both positions of the outline 9, there remains a difference between the ideal outline 12 and the two successive positions of the outline 9.

It can easily be seen that the surface area of the hatched curvilinear triangle decreases as the values of E and $e$ decrease on the one hand, and, consequently, their differences, and, on the other hand, the smaller is the angle $\alpha$ itself, between the directions of motion.

In practice, if the angle $\alpha$ is reduced to 60° (six directions of movement), or preferably to 45° (eight directions of movement), the surface of the hatched triangle becomes completely negligible.

Furthermore, if after having been subjected to the displacement represented by the vector $V_1$, the outline 9 is brought, by a curvilinear displacement, such as is defined by the arc $V_3$, into the position $9_2$, this outline envelops or includes the ideal outline 12 and the intermediate positions of the outline 9 will completely cover the hatched triangle.

Among all the possible means for displacing an outline parallel to itself so that it is enveloped or enclosed by a parallel outline lying a short distance away, two appear to be obviously preferable. The principle underlying them is illustrated respectively by FIGS. 3 and 3a.

On FIG. 3, starting from its mid-position, the outline is moved successively in the directions, radiating in star formation, $D_1$ to $D_8$ and, in the majority of cases, i.e. when the outline of the electrode is convex, the vectors $D_1$ to $D_8$ can be equal to each other. To pass from one working speed to the other, each of the vectors $D_1$ to $D_8$ is made equal to the difference in the length of travel involved in the electrical treatment between two speeds, increased, on the one hand, by the wear on the electrode and, on the other hand, by the thickness of the amount of metal which will be removed from the workpiece during the corresponding shaping operation. Taking these increases in the amplitude of motion into account, the latter will practically always remain less than a few millimetres.

In FIG. 3a, to move the outline 4 so that it is constantly enclosed by the outline 7, this outline 4 is first brought, by the displacement represented by the vector $V_1$, into position 4a, where it is tangential to the outline 7. During this displacement, two particular points M and N on the outline 4 will move respectively to $M_1$ and $N_1$. It is then sufficient to rotate simultaneously and through the same angle the points $M_1$ and $N_1$ about their original position with a radius equal to the vector $V_1$ to ensure that all the points on the outline 4a successively touch the outline 7.

Furthermore, if the rotation is effected at a constant speed, the time during which a section of equal length of the outline 4 merges with the outline 7 is substantially the same over the whole periphery of the outline 4a, so that the treatment of the workpiece is uniform over the whole outline of the surface to be shaped, i.e. the wear of the electrode and the thickness of the metal removed (or deposited) from (or on) the workpiece are uniform.

The carrier device shown in FIGS. 4 to 6 permits the movements shown diagrammatically in FIG. 3 to be obtained, while the carrier device shown in FIGS. 7 to 11 permits the circular displacement shown in FIG. 3a to be effected.

The electrode carrier shown in FIGS. 4 to 6 consists of a body 15 provided with a cheek or side plate 15a for attaching it through holes 16 to a suitable known device which ensures the forward feed of the electrode towards the workpiece to be shaped.

In a hollowed-out space in the lower part 15b of the body 15 an electrode support 18 is mounted by four screws 17, and the electrode can be attached to the support 18 by four screws entering holes 19.

Compared with the diameter of the screws 17, the receiving holes 20 for these screws in the part 15b of the carrier have a diameter increased by twice the value of the greatest possible displacement length of the electrode along the vectors $D_1$ to $D_8$ (FIG. 3).

The heads of the screws 17 bear against the upper face of the part 15b through the intermediary of a ring 21, which can slide over the face, and elastic discs or washers 22.

In the peripheral edge 15c of the body 15, micrometer screws 24 of the "Palmer micrometer gauge" type, $P_1$ to $P_8$ are attached radially by means of holding screws 23, the faces 25 of the nuts 26 of the micrometer screws being in contact with the electrode support 18.

The shanks or stems of the screws 24 carry metrically graduated scales 27 and the edges of the nuts carry scales 28. In known manner, it is possible to ascertain the position of the nuts 26 with great accuracy, for instance, to within $\frac{1}{100}$ of a millimetre, by reading the scales 27 and 28 in conjunction.

The electrode support 18 is centred and to move it by an amount $a$, for instance, in the direction X–Y, the four screws 17 are loosened, while maintaining the elastic pressure of the washers 22, the faces of the micrometer gauges $P_1$, $P_3$, $P_5$ and $P_7$ are released from contact with the electrode support. The micrometer gauge $P_4$ is moved by an amount $a$, the micrometer gauge $P_8$ is tightened to restore contact with the faces of the micrometer gauges $P_4$ and $P_8$ so that the electrode support 18 slides radially through a distance $a$ in the direction X–Y being guided between the faces of the micrometer gauges $P_2$ and $P_6$ which have remained in position. Then all the faces of the gauges can be tightened into contact with the electrode support. The screws 17 are then again screwed home. By proceeding thus, in succession, for the eight directions, the electrode support is off-centred on each occasion in a different direction and a shaping operation can be performed in each of these eccentric positions. As the speed of the device feeding forward the electrode carrier remains constant, the duration of each of these operations is substantially the same so that the wear over the periphery of the electrode is uniform.

By using a number of micrometer screws which is a multiple of four, when the displacement is effected in one direction, by manipulating two screws diametrically opposite, this displacement is controlled by two opposite screws lying perpendicular with reference to the preceding two.

In the embodiment shown in FIGS. 7 to 11, the electrode carrier consists of a body 31 and an electrode support 32 provided respectively with means 33 and 34 for attaching them to the device feeding the electrode forward.

The body and support 31 and 32 are similar and are each provided with two symmetrical, axially oriented recesses, which provide housings for the bearings 35 in the form of truncated cones and for thrust blocks with ball bearings 37.

In each of these recesses are housed the cylindrical barrels of stub shafts 38 and 39 for the body 31, and 40 and 41 for the electrode support 32.

The shafts 38 and 39 carry gear teeth 38a and 39a which engage with an intermediate pinion 42 mounted loosely on a shaft or spindle 43 centred in the body 31.

The shafts 38 and 39 terminate in dove-tailed shoulders or lugs 38b and 39b which can slide in the correspondingly shaped grooves 40a and 41a of the cams 40 and 41. Thus, the electrode support 32 is suspended from the body 31 by these assemblies.

The shaft 40 has a square shaped tongue 40b (FIGS. 7 and 11) which acts as a support for a hollow threaded rod 45 one part of which is smooth and graduated. The nut 46 which screws on this rod 45 is in the form of a plug and has an axial rod 47 passing through the hollow rod 45 and through a transverse bore 49 in the shaft 38. Through a shoulder 47a on this rod and a keyed ring 48, the rod 47 is connected to the shaft 38 and held against axial movement within bore 49 but is capable of rotating within said bore. The lug 39b is held in the dove-tailed groove of the shaft 41 by a holding screw 75.

The opposite faces of the body and support 31 and 32 are similarly enlarged by two circular plates 50 and 51 welded along their edges.

The upper plate 50 carries an electric motor 52 which, through a worm 53, drives a gear wheel 57 keyed on a shaft 58 which rotates in bearings 59 and 60, the latter being carried by a tongue connected to the plate 50.

A pinion 62 can slide on the shaft 58 and thus, in the top position, it meshes with the teeth 39a and, in the bottom position, is released from the latter.

This disengaging operation is effected by a forked slide 63 which can be held in the upper position by the end 64a of a spring bolt 64.

The two sets of gear teeth 38a and 39a being equal, the shafts 38 and 39, and consequently the shafts 40 and 41 rotate at each instant at the same angle, in the same direction and at the same speed due to the intermediate pinion 42.

The dove-tailed assemblies are adjusted with reference to the teeth in such a manner that, during this simultaneous rotation, they can lie in the same diametral plane of the body and support 31 and 32, i.e. at this instant, the two dove-tailed assemblies are in line.

This particular position is indicated by the alignment or coincidence of a pointer 65a carried by a tongue 65 attached to the plate 50, with a radial line 66 carried on the upper face of the tongue 40b (position shown in the drawings).

In this position, the two faces 67a and 68a of the tongues 67 and 68 are parallel and are at their maximum or minimum distance apart.

The carrier also includes a gear box 69 which is attached to the edge of the plate 50 and the lower, folded back edge 69a of which comes in contact with the lower face of the plate 51 through the intermediary of a gasket 70.

This gear box 69 has in its periphery openings permitting manipulation of the nut 46, reading of the scales (micrometer gauge of Palmer type) carried by this nut and the rod 45, insertion of wedges of calibrated thickness between the contacts 67a and 68a and manipulation of the screw 75.

On starting, the cylindrical barrels of the shafts are arranged to be exactly co-axial, which can be verified by the immobility of the support 32 with reference to the body 31 when, with the motor 52 running, the pinion 62 is engaged; this position corresponds to the thickness of a setting wedge inserted between the faces 67a and 68a.

To set the support 32 with reference to the body 31, the index marks 65a and 66 coinciding, the nut 46 is turned until it is possible to insert between the faces 67a and 68a, the setting wedge matched with a wedge of calibrated thickness and corresponding to the radius of the circular motion desired. The pinion 62 is then reengaged and the motor started for the shaping operation.

The speed reduction of the motor is controlled so that the duration of the circular motion of the electrode support is approximately one revolution per minute.

The carrier device for translational circular motion which has just been described permits displacements of considerable amplitude. It can be replaced when these motions are of small amplitude, for instance in the case of shaping by spark discharges, by the devices shown in FIGS. 12 to 15.

The device shown in these figures consists of an upper body 101 adapted to be attached through holes 101a to an electrical shaping head, for instance, for all kinds of electrical shaping operations, by spark or arc discharges as also by electrolytic methods, whether their purpose is to remove or deposit metal.

The upper body carries an electric motor 102 provided with a reduction gear, which drives a pinion 103 meshing with a pinion 104 connected to an axial pin 105 mounted on a body 101 by means of needle bearings 106 and 107.

On the body 101 is screwed an assembly sleeve 109 for adjusting the axial play which by means of the thrust block with ball bearings 110 with flat roller tracks, carries the lower body 111 to which is attached by tapped holes 111a either the electrode or the workpiece itself when the electrode is free.

The support 111 is connected to the sleeve 109 by pairs of coarse-pitch springs 130 and 131 with a small number of turns, the terminal eyes of which are attached respectively to pins 132 and 133 attached to the support 111 and to pins 134 and 135 attached to the sleeve 109.

Four pairs of springs are used in the form of embodiment shown in the drawings: the pull of one of the springs in each pair tends to rotate the support in one direction, with reference to the sleeve, while the other acts in the opposite direction. Thus, the sleeve and the support assume an equilibrium position with reference to each other towards which they are forcibly recalled if they are unbalanced or deflected since in each pair of springs, the spring acting in the direction of the imposed deflection loses much of its effect while the force of the spring acting in the opposite direction is substantially reinforced.

Furthermore, two adjacent springs belonging to two different pairs, such as 130a, 131a and 130b, 131b combine their effect to produce a radial pull on the support 111, all these tensile forces being balanced around the centre of the sleeve 109.

Thus the support is centred in the sleeve and instantly, and automatically recentres if it is deflected from its equilibrium position.

In the axis of the support 111 is pivoted on needle roll bearings a finger 114 connected to the shaft 105 in such manner as to permit of its being offset with reference to the latter.

In fact, the shaft 105 carries a plate 115 formed with a mortice or dovetail slot 115a to which the tenon 117 engages, which terminates at the top of the finger 114. This tenon has a tapped bore 117a. The centering of the tenon in the mortice is ensured by a wedge 116 and set screws 136. The mortice 115a is closed at one end by a support 137 for a spring 138 which acts on the tenon 117 and, at the other end, by a nut 139 threaded at a different pitch and in the opposite direction from that of the bore 117a.

The support 137 and the nut 139 are held in position by screws 140. The screw 119 which is engaged in the tapping 117a and in the nut 139 contains, for this purpose, in series after each other, two different threaded portions 119a and 119b.

Thus, for one turn of the screw 119, the displacement of the tenon 117 in the mortice is equal to the difference in pitch between the two threads which makes a very exact adjustment possible for a predetermined angular displacement of the said screw: the backlash of the threads is compensated by the spring 138.

This control device is enclosed between the ball bearing thrust blocks 120 and 121, the first of which is fixed, while the second, centred by the shoulder of the finger 114, is able to slide in contact with the lower face of the plate 115.

Thus when, by manipulating the screw 119, the axis of the finger 114 does not coincide with the axis of the shaft 105, the support 111 performs a translational motion of circular rotation with reference to the upper body 101. During this motion, the balls of the thrust block 110 roll in a radial direction and the pairs of springs 130 and 131 are deflected. These springs oppose any rotational motion of the support 111 and if it begins to rotate, they return it into its original angular position, with reference to the springs 109. Furthermore, since the springs tend to centre the support in the sleeve, all radial play of the assembly is compensated.

When (see FIG. 16), one of the two devices which has just been described with reference to FIGS. 8 to 11 or FIGS. 12 to 15, designated generally as K, is attached to a head T ensuring the automatic advance of an electrode U for shaping a workpiece W, each of the points Z on the periphery of this electrode is displaced, by reason of the circular motion along a vector $ZZ_1$ and, by reason of the advance produced by the head T, along a perpendicular vector $ZZ_2$. The resulting displacement thus has the direction $ZZ_3$ which, when the shape of the electrode is oblique with reference to the axis of advance of this electrode, makes it possible to obtain a shaping operation of higher quality, since the electrode approaches the surface to be treated almost perpendicularly.

In certain cases, notably in the case of shaping by spark discharges, it, further, may be preferable to impart to the workpiece to be shaped a curvilinear translational motion while the electrode is caused to move only rectilinearly in the direction of the said workpiece. This is the case when the motor driving the electrode in curvilinear motion may, for instance, by vibration, have an unfavourable effect on the feed mechanism of this electrode.

For this purpose, it is possible to proceed as shown in FIG. 17.

The shaping apparatus is mounted on a rigid frame 175 which supports the head T which effects the forward feed of the electrode U in a vertically descending direction. This electrode is intended to shape a hole in the workpiece W.

The workpiece W rests on a plate supported by the ball bearings 176 i.e. a multiplicity of balls contained between two plane surfaces and the workpiece W is solidly attached by a strap 177 to the lower part 111, for instance, of the device shown in FIGS. 12 to 15. The upper body of this device is rigidly connected to the frame 175 by a clip 178. The workpiece is immersed in a tank containing a dielectric in the case of shaping by intermittent arc or spark discharges, or an electrolyte in the case of electrolytic treatments.

The device described with reference to FIGS. 12 to 15 can produce a curvilinear displacement of very small radius controlled within accurate limits. If the connection between the body 111 and the workpiece W in the embodiment shown in FIG. 17 is perfectly rigid, the accuracy of shaping is equal to the accuracy which could be obtained by acting directly on the electrode rather than on the workpiece itself.

When the dimensions of the workpiece W are large, it is possible to effect its displacement in curvilinear motion by a number of devices K simultaneously. Thus, in FIG. 17, one device $K_1$, similar to K and controlled in such manner as to be synchronous therewith, acts simultaneously with the device K on the workpiece W.

What we claim is:

1. Apparatus for relatively moving an electrode element and a workpiece element for electrically shaping the latter, comprising separate, approximately coaxial holding means for each of said element, a first one of said holding means and its related one of said elements being linearly movable axially and a second one of said holding means and its related one of said elements being restrained against such linear, axial movement, one of said holding means comprising a first body member restrained against movement transversely of the line of said linear movement, a second body member coaxially aligned with said first body member, a connection between said body members restraining them against relative rotary movement about said line and against relative movement in parallelism with said line, and actuating means for successively moving said second body member translationally to angularly spaced points in a plane perpendicular to said line whereby to enable said electrode element to form, on said workpiece element, a surface substantially uniformly spaced from directly opposed surface portions of said electrode element, said actuating means comprising a circular series of radially directed micrometer screws coacting between coplanar portions of said first and second body members.

2. Apparatus for relatively moving an electrode element and a workpiece element for electrically shaping the latter, comprising separate, approximately coaxial holding means for each of said elements, a first one of said holding means and its related one of said elements being linearly movable axially and a second one of said holding means and its related one of said elements being restrained against such linear, axial movement, one of said holding means comprising a first body member restrained against movement transversely of the line of said linear movement, a second body member coaxially aligned with said first body member, a connection between said body members restraining them against relative rotary movement about said line and against relative movement in parallelism with said line, and actuating means for successively moving said second body member translationally to angularly spaced points in a plane perpendicular to said line whereby to enable said electrode element to form, on said workpiece element, a surface substantially uniformly spaced from directly opposed surface portions of said electrode element, said actuating means comprising a first pair of laterally spaced shafts carried upon one of said body members in parallelism to said line, a second pair of similarly laterally spaced shafts carried upon the other of said body members in parallelism to said line and in approximate alignment with the shafts of said first pair, adjusting means coacting between said pairs of shafts for shifting said pairs equally in similar lateral directions out of such alignment, connecting means interconnecting corresponding shifts of the two said pairs to constrain them to turn together, and means for turning said shafts in similar directions and at similar angular speeds, whereby to cause relative translational movement of said body members, corresponding shafts of said pairs having sliding interconnections permitting lateral relative displacement of said shafts, and said adjusting means comprising a micrometer screw operative between corresponding shafts for effecting such displacement.

3. Apparatus for relatively moving an electrode element and a workpiece element for electrically shaping the latter, comprising separate, approximately coaxial holding means for each of said elements, a first one of said holding means and its related one of said elements being linearly movable axially and a second one of said holding means and its related one of said elements being restrained against such linear, axial movement, one of said holding means comprising a first body member restrained against movement transversely of the line of said linear movement, a second body member coaxially aligned with said first body member, a connection between said body members restraining them against relative rotary movement about said line and against relative movement in parallelism with said line, and actuating means for successively moving said second body member translationally to angularly spaced points in a plane perpedicular to said line whereby to enable said electrode element to form, on said workpiece element, a surface substantially uniformly spaced from directly opposed surface portions of said electrode element, said apparatus further including an elastic interconnection between said body members, providing radial forces uniformly distributed around an axis common to the two said body members and also tangential forces uniformly distributed around said common axis, said body members carrying separate shifts in end-to-end eccentric relationship with means coacting between said shafts for varying such eccentricity, and a motor carried by one of said body members connected to the shaft carried by the latter body member for rotating said shaft.

4. Apparatus according to claim 3, in which said elastic interconnection comprises pairs of identical coil springs, the ends of which springs are respectively attached to each of said body members, the two springs of each pair being arranged symmetrically with reference to a radial plane, and the different radial planes of symmetry being uniformly distributed around the common axis of said body members.

5. Apparatus according to claim 3, the body member, by which said motor is carried, comprising a cylindrical sleeve, an annular plane surface of said sleeve and an opposed annular plane surface of the other body member being in laterally shiftable thrust relationship, and said shafts having adjoining end portions disposed between annular thrust bearings abutting against opposed annular faces of said body members.

6. Apparatus according to claim 3, further including a mortice and tenon connection between adjacent ends of said shafts, and screw means for adjusting the position of the tenon in the mortice, transversely of said line, to vary said eccentricity.

7. Apparatus according to claim 6, said screw means including an adjusting screw having oppositely threaded portions of different pitches, one of said threaded portions coacting with said tenon and the other of said threaded portions coacting with a nut fixed to a mortice-forming portion of the mortice and tenon connection.

References Cited

UNITED STATES PATENTS

| | | | |
|---|---|---|---|
| 2,902,584 | 9/1959 | Ullmann | 219—69 |
| 2,951,142 | 8/1960 | Ullmann | 219—69 |
| 2,934,631 | 4/1960 | Imalis | 219—69 |
| 1,073,148 | 9/1913 | Lanning | 74—571 |
| 2,829,528 | 4/1958 | Halide | 74—86 |
| 2,839,969 | 6/1958 | Anderson | 269—60 |
| 3,060,114 | 10/1962 | Sanders | 204—225 |
| 3,135,852 | 6/1964 | Bently et al. | 219—69 |
| 3,194,938 | 7/1913 | Smith | 219—69 |

RICHARD M. WOOD, *Primary Examiner.*

R. F. STAUBLY, *Assistant Examiner.*

U.S. Cl. X.R.

204—143